April 3, 1928.
G. B. STANLEY
1,664,712
TANK TRUCK FAUCET
Filed April 27, 1922
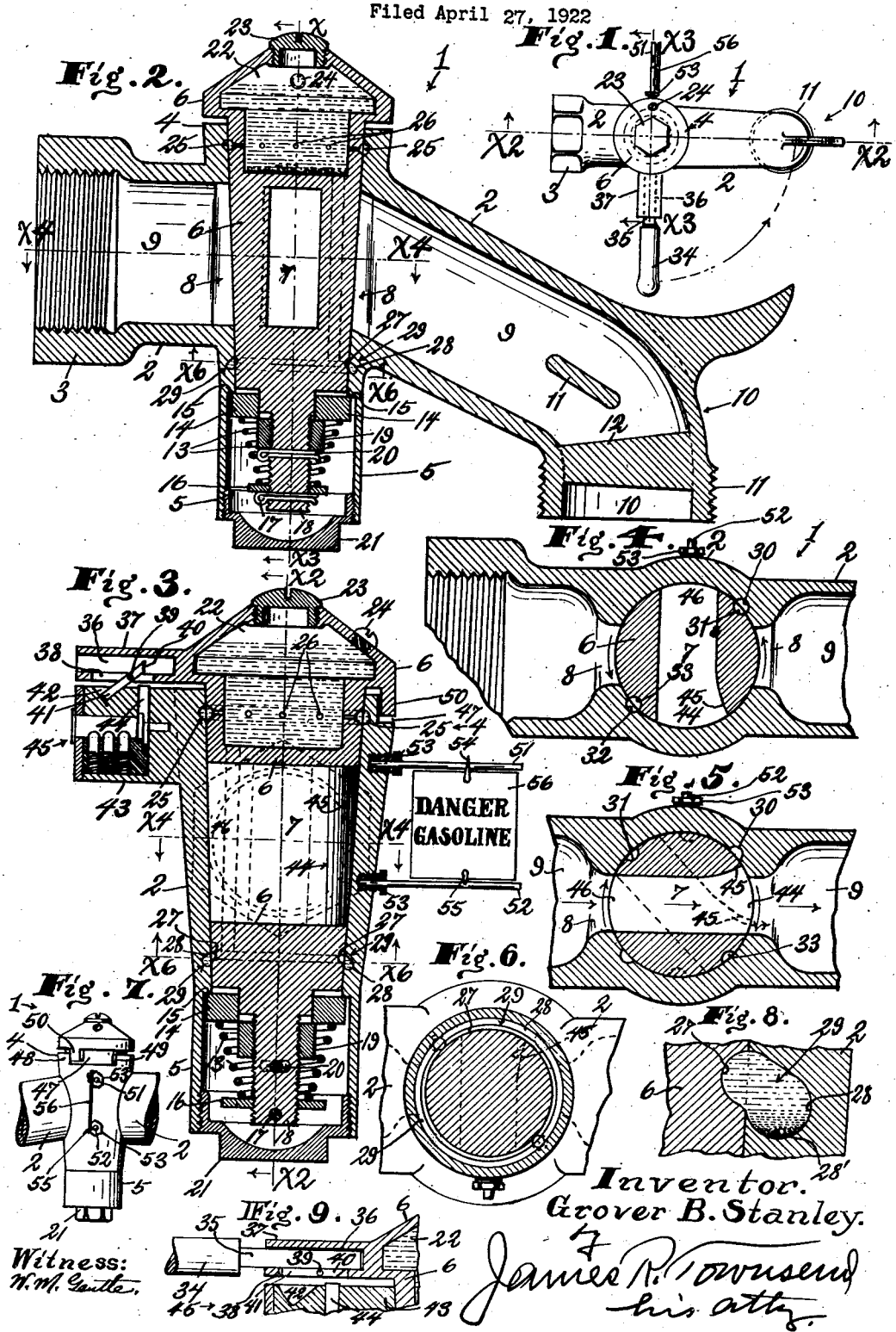
Inventor.
Grover B. Stanley.
James R. Townsend
his atty.
Witness:
W. M. Gentle.

Patented Apr. 3, 1928.

UNITED STATES PATENT OFFICE.

GROVER B. STANLEY, OF PALMDALE, CALIFORNIA.

TANK-TRUCK FAUCET.

Application filed April 27, 1922. Serial No. 556,913.

This invention is more particularly intended for use on tanks for the delivery of refined oils such as gasoline, coal oil and distillate.

There are numerous difficulties to be overcome in the operation of valves for this purpose, such for instance as the leakage likely to arise from the excessive expansion and contraction which results from the use of faucets for delivering liquids of this character in hot weather. The faucet being usually exposed to the sun's rays and the volatile liquid such as gasoline tending to rapid cooling of the faucet when the gasoline flows therethrough and evaporates therefrom; furthermore the liquid is very penetrative and it is necessary that the joints be tight in order to prevent the flow of the gasoline therethrough, and it has been customary to lubricate the faucet with a suitable liquid such as glycerine that is not subject to be cut by the gasoline or other like hydrocarbon, and a feature of this invention is the construction of the valve so as to maintain a lubricating body therein in the most efficient manner.

Furthermore when the faucet is closed after drawing liquid therethrough the slot in the plug of the faucet contains a portion of liquid which expands as the faucet heats up in the rays of the sun or otherwise and this expansion causes a portion of the liquid to force its way out through the joint, thus washing away some or all of the lubricating film in the joint.

An object of the invention is to maintain a predetermined pressure for holding the valve plug in its seat and for protecting the lower end of the valve plug, and the means which fasten the plug in its bearing.

Another requirement for the delivery of gasoline in cities and towns is that the faucet shall be locked shut in the absence of the attendant. This is found necessary in order to prevent danger of conflagrations.

An object of this invention is to so construct the faucet that the same will be automatically locked when the faucet is closed and the handle removed to provide means whereby when the handle is in place, the faucet plug will be automatically released.

Another object is to so construct the lubricant container that foreign substances will settle into the bottom thereof and not pass into the lubricating channels; and also to so construct the bottom annular channel that the metallic substance displaced from the contacting surface of the casing and plug will settle into an annular depression in the casing.

Another object of invention is to provide a faucet with a tapered socket in which is seated a movable tapered plug with means for continuously maintaining a pressure on the plug to firmly hold it seated in the socket to prevent leakage; and to also hold the plug firmly in place to prevent oils such as gasoline or kerosene entering the lubricating space between the walls of the socket and plug to cut the lubricant fluid such as glycerine. And in order to prevent an excessive cutting of the lubricant by the oils that inadvertently enter this space circular and vertical channels are connected and arranged so that the lighter oils such as gasoline or kerosene can pass upward through the heavier lubricant such as glycerine and escape into the lubricating chamber in the end of the plug where means are provided for removing them when necessary.

Other objects, advantages and features of invention may appear from the accompanying drawing, the subjoined detail description and the appended claim.

The accompanying drawing illustrates the invention.

Figure 1 is a plan view of the faucet with the handle in place ready to move the plug from closed to open position; an arrow and dotted lines indicating the direction the handle is moved to open the faucet.

Fig. 2 is an enlarged central section on line $x^2$, Fig. 1.

Fig. 3 is an enlarged cross section on line $x^3$, Fig. 1.

Fig. 4 is a fragmental section on line $x^4$, Figs. 2, 3, showing the faucet in closed position.

Fig. 5 is a fragmental section analogous to Fig. 4 with the faucet open.

Fig. 6 is a fragmental section on line $x^6$, Figs. 2, 3.

Fig. 7 is a fragmental side elevation of the faucet as seen opposite to the handle side.

Fig. 8 is an enlarged sectional view of a portion of the faucet showing a detail of the lower annular lubricating channel.

Fig. 9 is a fragmental sectional view of the upper left hand corner of Fig. 3 showing the handle inserted in its socket to unlock the plug so that it can be turned on its axis.

The faucet 1 comprises a hollow casing 2 having a threaded end 3 that is adapted to attach to a discharge pipe of a delivery tank not shown, or if desired the faucet can be attached to any discharge pipe that has substantially the same bore and thread as the faucet.

The casing 2 is provided with upper and lower extensions 4, 5 through which there is a tapered bore to fit a rotary plug 6 which is provided with a passage 7 that is transverse to a passage 8 through the casing 2 when the plug 6 is in closed position; the passages 7, 8 register when the plug 6 is turned ninety degrees on its axis; and when in such position a passage 9 through the casing 2 is open so that liquid can pass through the faucet and discharge from a spout 10.

The spout 10 is inclined downward and provided with an exterior thread 11 by which it can be connected to a hose, not shown. The spout 10 is also provided with cross vanes 11, 12 that prevent a whirling movement of liquid as it discharges from the spout.

The plug 6 is held in close contact with the inner wall of the casing 2 and extensions 4, 5 thereof by means of a tension spring 13 that is interposed between a washer 14 that abuts a shoulder 15 of the extension 5, and a washer 16 secured by a cotter pin 17 on a threaded extension 18 of the plug 6; spring 13 permits expansion and contraction of the plug 6 within the casing 2 and yet maintain a tight fit between the contacting walls. A nut 19 is provided on the stem 18 for holding the washer 14 in contact with the shoulder 15 and a cotter pin 20 is provided for holding the nut 19 in an adjusted position.

The lower end of extension 5 is threaded to receive a nut 21 for enclosing and protecting the yielding means for holding the plug 6 within the casing 2.

Means are provided for lubricating the contacting walls of the casing and plug. In the upper end of plug 6 is a chamber 22 for a lubricant preferably glycerine or other fluid that resists the cutting action of gasoline; and this chamber is fitted through an orifice normally closed by a screw plug 23.

Also in the top wall of the chamber 22 is a vent for overflow of liquid, and this vent is open while the chamber is being filled; and is normally closed by a plug screw 24.

In the inner wall of extension 4 is provided an annular recess that normally registers with a similar recess in the outer wall of the plug 6 and when registering with each other these recesses form an annular channel 25 that is circular in cross section; and this channel is connected to the chamber 22 by small ports 26.

Near the lower end of the plug 6 is an annular recess 27 that is semi-circular in cross section; and in the inner wall of the extensions and adjacent to the recess 27 is a larger annular recess 28 that is also semi-circular in cross section, and these recesses register with each other to form an annular channel 29 that is an irregular and tilted ellipse in cross section; that is, the long axis of the ellipse is inclined relative to the axis of the plug 6 and the larger portion of the ellipse is formed within the wall of the casing 2 so that sediment or foreign substance entering the annular channel 29, formed by recesses 27, 28 will settle into the bottom of the recess 28 as best shown in Fig. 8, in which the dots 28' indicate sediment. The chamber 22 is so formed that it is of considerable depth below the ports 26 so that sediment can settle in the bottom of the chamber and not pass between the walls of the casing and plug to score and cut them.

The annular channel 25 is connected to the annular channel 29 by channels 30, 31 and 32, 33 that are respectively cut in the contacting walls of casing 2 and plug 6; and the channels 30, 31, and 32, 33, respectively, register with each other when the faucet is closed, that is, the channel 30 registers with channel 31 and channel 32 registers with channel 33 as best shown in Figs. 4 and 6; and these channels lubricate the contacting walls when the plug 6 is turned either to open or closed position.

Also it is obvious that lighter oils than glycerine can pass upward and escape into chamber 22 if inadvertently they enter the lubricating space between the socket and plug.

The plug 6 is turned in the casing 2 to move the passage 7 into and out of register with the passage 8 by means of a handle 34 that has a shank 35 adapted to extend into a socket 36 of a side extension 37 that is integrally connected to the top end of the plug 6.

In the bottom wall of the extension 37 is a slot 38 in which is pivoted on pin 39 a gravity dog 40 that has a heavy end 41 adapted to fall into a recess 42 formed in a side extension 43 of the casing 2 and locks the plug 6 from further rotation when said plug has been sufficiently moved to full closed position and the handle 34 removed. That is, plug 6 has been moved to full closed position and the shank 35 is removed from the socket 36, such removal of the shank releases the dog 40 and permits the heavy end 41 thereof to enter the recess 42 and thus prevents the plug 6 from being turned until the heavy end 41 of the dog 42 is raised out of the recess 42 and this is done by inserting the shank 35.

Means are provided for holding the dog in locking position after the handle is removed, and comprise a key actuated plunger 44 that is moved up by the key lock 45' to engage the under side of the light end of the dog 40 and to hold it in fixed position so that the heavy end 41 can not be disengaged from the slot 42 by insertion of the shank 35 or its equivalent; and with this arrangement the plug 6 can not be turned until the dog is released by unlocking the plunger 44. The plunger 44 and operating lock 45' can be of any desired construction.

The purpose of the dog latch 40 is to hold the plug 6 in fully closed position to comply with fire ordinances; and the lock connected therewith to prevent nonemployees or unauthorized persons from removing oil from the tank to which the faucet is connected.

The passage 7 is enlarged at its discharge end 44 by cutting away a portion of the side wall 45 so that practically all the gasoline can escape from the passage as the valve is closed; that is the narrower or inlet end 46 of the passage is entirely covered by the casing wall to shut off the supply of gasoline before the enlarged or outlet end 44 is entirely closed or covered by the casing wall; so that the gasoline in the passage can fully escape to spout 10, as illustrated by dotted lines in Fig. 5.

In Fig. 4 the circular arrows indicate the direction of movement to open the valve and in Fig. 5 they indicate the closing movement.

The full opening and closing movement of the valve is 90 degrees as indicated by the arrow and dotted line in Fig. 1; and in Fig. 7 the means for limiting this movement is shown. As seen therein the top end of the upper extension 4 has a cutaway portion 47, the opposite ends of which form stops 48, 49 that are adapted to engage an extension 50 integrally connected to the plug 6 when it is moved to full closed or open position.

The faucet is provided with a tag holder that consists of upper and lower spring rods 51, 52 that are secured in the casing 2 by means of pinch nuts 53; and these rods are provided with oppositely disposed hooks 54, 55 for extending through holes in the ends of a metal tag 56 on which is designated the contents of the tank with which the faucet is connected.

The tag 56 is placed on the hooks 54, 55 by springing the rods 51, 52 toward one another until the hooks can be inserted through holes in the ends of the tag; after which they are released and their spring tension will then hold the tag firmly in place.

The purpose of the tag 56 is to indicate the nature of the liquid with which the faucet is connected so that an operator will know positively what liquid he is handling; and so that he will not easily mistake highly explosive liquids for less combustible oils, and thereby prevent accident.

I claim:

The faucet set forth comprising a casing having a passage therethrough; a tapered plug in said casing having a passage therethrough that is normally transverse to the passage through the casing when the plug is in a fully closed position; a handle for actuating said plug to move the passage therethrough into register with the passage through said casing; a chamber in said plug adapted to contain a lubricant; ports in said plug leading from said chamber, an upper annular channel communicating with said ports, an annular channel in the lower end of said plug, longitudinal channels formed in said plug and casing connecting the said upper and lower channels and means for with-holding sediment from said channels.

In testimony whereof, I have hereunto set my hand at Palmdale, California, this 15th day of April, 1922.

GROVER B. STANLEY.